2,844,559

GLYCOLIC ACID AS A CORROSION INHIBITOR IN MIXTURES OF ETHYLENIC MONOMERS AND POLYESTERS OF ALPHA ETHYLENIC DICARBOXYLIC ACIDS

Earl E. Parker, Milwaukee, Wis., assignor to Pittsburgh Plate Glass Company, Allegheny County, Pa., a corporation of Pennsylvania No Drawing. Application June 17, 1954
Serial No. 437,586

8 Claims. (Cl. 260—45.4)

This invention relates to polymerizable or interpolymerizable materials and the polymers and interpolymers thereof, said materials comprising polyesters of polyhydric alcohols and carboxylic acids containing alpha-beta ethylenic groups, or comprising mixtures of these polyesters and soluble, interpolymerizable monomers containing $>C=CH_2$ groups, preferably attached to negative radicals. The invention has particular relation to the reduction of the corrosiveness of such materials with respect to certain metals, notably copper and its alloys, tin or the like.

It has heretofore been suggested to prepare polyesters which are polymerizable by addition reaction and which comprise the products of esterification of a polyhydric alcohol, notably a glycol, and an alpha-beta ethylenic dicarboxylic acid such as maleic acid or fumaric acid. These polyesters can be subjected to polymerization by heating, preferably in the presence of a free radical initiator type catalyst, such as benzoyl peroxide, in order to effect cross-linking through addition reaction of the reactive ethylenic groups in the polyester chains. Even more importantly, it has been suggested to mix the foregoing polyesters with vinyl, or vinylidene, or acrylic, or allylic monomers, or similar monomers containing terminal $>C=CH_2$ groups which as previously stated, usually are attached to a negative radical. The resultant polyesters or mixtures thereof, with monomers are usually liquid materials which can be poured into molds and caused to undergo addition reaction by the application of heat. The resultant reactions are usually quite fast and can be effected at moderate temperatures and without the application of any substantial pressure. The polyesters and interpolymerizable mixtures thereof, with monomers have enjoyed a rapid and increasing use in the preparation of castings, laminants, and other articles.

In certain fields, however, they have not proven to be entirely satisfactory. For example, it has been found that when they are in contact with certain metals and notably copper or copper containing materials such as bronze or brass, they exert an objectionable corroding action, which action seemingly is accelerated or promoted by free radical initiators such as benzoyl peroxide and similar materials conventionally employed to promote the rate of addition reaction.

This invention comprises the discovery that glycolic acid constitutes a valuable additive or modifier for the polyesters and mixtures of the polyesters with monomers containing $>C=CH_2$ groups. When added to a polyester containing alpha-beta ethylenic groups, or preferably a mixture of such polyester and a monomer containing a $>C=CH_2$ group, the glycolic acid is quite effective in retarding the rate of gelation, especially before free radical initiators such as benzoyl peroxide have been added. More importantly however, the glycolic acid constitutes an effective inhibitor of corrosion especially with respect to metals such as copper or the alloys or compounds of copper such as bronze or brass. This is a function which most inhibitors of gelation or premature polymerization are not adapted to perform. Moreover, glycolic acid in the interpolymerizable mixture in appropriate amount, does not greatly affect the curing rate of the mixture when the latter is catalyzed and brought to the usual curing temperature.

The electrical field constitutes one important branch of the art in which the principles of the present invention may be applied with success. In this field, it is often desirable to coat or embed copper, or copper containing material such as wires and electrical contacts with, or in, the interpolymerizable mixtures containing peroxide as catalysts and then to bake them at elevated temperature in order to effect resinification of the mixtures through addition reactions. Under such conditions, there is a strong tendency to corrode the copper, thus causing discoloration of the resin and perhaps adversely affecting the electrical and curing properties of the resin. The physical properties of the metal itself may also be adversely affected.

It has further been proposed to prepare polyesters comprising dicarboxylic acids, such as maleic acid and a mixture of glycols, such as propylene glycol, or diethylene glycol and a polyethylene glycol. The resultant polyesters are emulsifiable in water to form oil-in-water emulsions in which the polyethylene glycol acts as a chemically combined emulsifier. The interpolymerizable mixtures of these polyesters and monomers such as styrene or diallyl phthalate are also emulsifiable to provide oil-in-water dispersions. The emulsions of these materials have been used as agents for coating or impregnating preforms and mats of such fibrous materials as glass fibers or the like.

The interpolymerizable mixtures of polyesters and monomers have also been used to impregnate and seal the pores in castings of metals and notably of copper or copper containing materials such as bronze or brass. In such use, the casting to be treated is subjected to vacuum and is then immersed in the liquid mixture under pressure to drive the latter into the pores to the maximum extent. Excess polymerizable material is washed away with water to leave the pores filled with said polymerizable composition. Subsequently, the casting is baked to cross-link the polyester molecules, thus providing a hard, insoluble thermoset resin filling for the pores. Where the castings contain copper or other corrodible metal such as tin, a problem is presented because prior to, or in the course of curing the interpolymerizable mixture, the resin tends to affect the metal to an objectionable degree.

In mixtures employed in either the electrical field, the casting impregnating field, or in similar fields, small corrosion inhibiting amounts of glycolic acid may be incorporated in order practically to eliminate or at least greatly to reduce the tendency of the mixture to corrode copper or copper containing materials.

Polyesters of dihydric alcohols and alpha-beta ethylenically unsaturated dicarboxylic acid which singly, or in mixture with monomers containing $>C=CH_2$ groups, can be used to coat, to invest, or to impregnate copper containing materials, may be prepared in accordance with well recognized techniques such as are disclosed in numerous patent and literature references. Examples of patent references containing disclosures of the preparation of the appropriate polyester and mixtures thereof with ethylenic monomers comprise: 2,593,787, 2,409,633, 2,443,735, 2,443,741, 2,450,552, and many others. The preparation of such polyesters is also disclosed in the article in "Industrial and Engineering Chemistry," December 1939, page 1512, and again in the same publication for January 1940, page 64.

The present invention contemplates the use of various of the polyesters such as are disclosed in the foregoing citations and mixtures of polyesters with ethylenic monomers as media for coating, impregnating or otherwise contacting copper or its alloys and compounds. In these, glycolic acid may be employed as a protecting agent to prevent the action between the metal and the contacting medium.

As previously indicated, glycolic acid further constitutes a valuable agent for retarding premature gelation of the interpolymerizable mixtures especially after the incorporation of catalysts of addition reaction such as benzoyl peroxide or other peroxides. This invention also includes the broad use of glycolic acid as a gelation retarder, either with or without contact with copper or copper containing materials.

In the preparation of polyesters containing alpha-beta ethylenic unsaturation, various polyhydric alcohols may be employed; however, particular emphasis is placed on such dihydric alcohols as ethylene glycol, diethylene glycol, propylene glycol, trimethylene glycol, and others containing about 2 to 6 carbon atoms. As previously indicated, it is often desirable to include as emulsifying agents, substantial amounts, namely about 5 to 25 percent by weight based upon the polyester of polyethylene glycol, such as those of molecular weights between 300 and 4000, for example about 1300 to 1600 and being represented by the so-called Carbowax 1540 or 1540W. The use of a substantial amount of polyethylene glycol is especially desirable in those instances where it is contemplated to prepare polyesters which are water emulsifiable. In such polyesters, a polyethylene glycol component properly cooked with the other components of the polyester constitutes a cooked in or combined emulsifying agent which is exceptionally advantageous.

The use of polyethylene glycols in the preparation of polyesters and subsequent incorporation of the same with monomers such as styrene and the preparation of valuable emulsions of the resultant interpolymerizable mixtures is elaborated upon in a copending application Serial No. 318,870, filed November 5, 1952, by John R. Guenther. The techniques of this copending application may be employed in the preparation of emulsifiable materials for use in the practice of the present invention.

The dibasic acid components of the polyesters employed in the practice of the present invention include any of the conventionally recognized dibasic acids at least a part of which contain alpha-beta ethylenic groups. Such alpha-beta ethylenically unsaturated dicarboxylic acids include:

Maleic acid
Itaconic acid
Fumaric acid
Aconitic acid
Mesaconic acid
Citraconic acid
Methyl maleic acid and numerous others.

In the preparation of polyesters suitable for use in the practice of the present invention, the alpha-beta ethylenically unsaturated dicarboxylic acids may be employed singly (without modifying acids) however, it is often desirable and indeed it is usually preferable to employ such acids in admixture with dicarboxylic acids which are free of ethylenic unsaturation. Such acids include: aryl dicarboxylic acids of the type of phthalic acid, terephthalic acid and isophthalic acid, or methyl, chloro or other derivatives of such acids where the added groups are non-functioning. Non-ethylenic dicarboxylic acids which may be mixed with alpha-beta ethylenic acids previously discussed also include aliphatic dicarboxylic acid such as succinic acid, adipic acid, azelaic acid, sebacic acid and others containing for example up to 10 or more carbon atoms in an aliphatic chain.

While reference has been made to the dicarboxylic acids, this term has been used in a broad sense to include either the free dicarboxylic acids or the anhydrides thereof. The latter react with glycols to form the same polyesters as the free acids and are often preferable to the acids per se. This applies to both the alpha-beta ethylenically unsaturated dicarboxylic acid and the non-ethylenic acids.

It will be appreciated that in some instances, it may be desirable to include in the polyesters small amounts of fatty acids (preferably unsaturated) such as drying oil acids and being represented by linoleic acid, linolenic acid, clupanodonic acid, elaeostearic acid and others. Obviously, mixtures of the monocarboxylic acids, for example such as may be obtained by hydrolysis of drying or semi-drying oils, may be employed. Such mixtures usually will include some saturated acid components, as well as some components such as oleic acid, are not sufficiently unsaturated to impart drying properties to the esters.

In preparing polyesters suitable for use in the practice of the present invention the recognized techniques may be employed. Usually the polyhydric alcohol component will be present in an amount at least stoichiometrically equivalent to the total of the acid components and in many instances, it is preferable to employ a slight stoichiometric excess, e. g. 2 to 10 or 15, or more, percent excess of the alcohol component. The esterification customarily is conducted at a temperature around 300° F. or 400° F., e. g. 385° F. or at such other temperature as will cause esterification reaction with resultant evolution of water.

Removal of water may be promoted by the inclusion of a medium such as xylene designed to distill azeotropically with the water. Usually the reaction is conducted under such conditions as to exclude or substantially to exclude air from the reaction zone. Esterification is continued until desired viscosity is attained and until the acid value has been reduced to a value below about 50 or 60. The preferred range will be about 20 to 45, but sometimes the value is carried down to 5 or 10. In no instance is the reaction of esterification carried so far as to produce an insoluble, infusible ester product.

The proportion of non-ethylenic dicarboxylic acid may be extended from none at all up to the maxium amount. However, an appropriate range is suggested to be from about 0.25 to 10 moles per mole of the alpha-beta ethylenically unsaturated dicarboxylic acid. Very good products are obtained when the dicarboxylic acids are approximately equimolar with respect to each other. If fatty acids are included in the acid mixture, the proportion thereof will usually be relatively small, e. g. 1 or 2 moles to about 10 or 12 moles of the dicarboxylic acid or mixture of dicarboxylic acid.

Monomers which may be employed with the polyesters to increase the fluidity of the initial reaction mixture and also for purposes of cross-linking the polyester molecules during the curing operation include the various so-called monomers containing the terminal $$>C=CH_2$$

groups attached to a negative radical. Such monomers usually are liquids and soluble in, or compatible with, the polyesters and are susceptible of interpolymerization with the polyesters by addition reaction. Various classes of compounds containing terminal ethylenic groups are appropriate for the purpose. One such class of compounds comprises hydrocarbons such as:

Styrene
Alpha-methyl styrene
Para-methyl styrene
Divinyl benzene
Vinyl toluene, and others a second class comprises esters containing ethylenic groups and being represented by:

Vinyl acetate
Methyl methacrylate
Methyl acrylate

Allyl acrylate
Allyl acetate
Diallyl phthalate
Diallyl succinate
Diallyl adipate
Diallyl sebacate
Diethylene glycol bis (allyl carbonate)
Triallyl phosphate a third class comprises nitriles such as: Acrylonitrile.

Any of these ethylenically unsaturated monomers may be combined with any of the polyesters herein disclosed. It is further contemplated to employ mixtures of the monomers containing for example equal parts by weight of two or more monomers or any other appropriate mixture as may be desired for specific purposes. The monomers usually will be employed in an amount in a range of about 10 to 60 percent by weight based upon the interpolymerizable mixture. The monomers preferably are added to the polyesters while the latter are hot enough to be fused and fluid; for example the temperature may be about 100° C. to 150° C. or thereabouts.

It will be recognized that the interpolymerizable mixtures of polyesters containing alpha-beta ethylenic unsaturation and monomers containing terminal ethylenic groups undergo polymerization to form gels at a relatively rapid rate even in the absence of catalysts and this is especially true in those instances where it is desirable to heat the polyester and the monomer in order to promote solution of the two and thus to form a homogeneous mixture. In order to prevent premature gelation, it is usually essential that one or both components of the mixture include an inhibitor of gelation or premature polymerization. It will be recognized that glycolic acid in addition to its capacity for inhibiting corrosion of copper also constitutes an inhibitor of gelation of some value. Glycolic acid is also an extender of the so-called "tank life" of the interpolymerizable mixture. "Tank life" is considered to be the period which the interpolymerizable mixtures can be allowed to stand after the incorporation of the free radical initiator, before the final curing operation and without premature gelation.

Glycolic acid may be added to the interpolymerizable mixture or to a component thereof, such as the polyester, prior to the addition of the monomer, and the glycolic acid may thus function as a "tank life" extender, or gelation inhibitor. However, it is also contemplated additionally to include in the interpolymerizable mixtures conventional gelation inhibitors such as the catechols, quinone, hydroquinone, or the quaternary ammonium salts such as trimethyl benzyl ammonium chloride, elaborated upon in the previously mentioned Patent 2,593,787. Appropriate phenolic gelation inhibitors comprised quinone, hydroquinone, 4-tertiary-butyl catechol, 3-isopropyl catechol, 4-normal-butyl catechol, and others. These may be employed in a range of about 0.001 to 5 percent, based upon the polyester component.

Glycolic acid when employed as a corrosion inhibitor or a gelation inhibitor in the foregoing mixtures of monomer and polyester may be employed in an amount within a range of about 0.01 to 5 percent based upon the interpolymerizable mixture.

In order that products of greatest hardness and strength be obtained from the interpolymerizable mixtures, it is desirable that the mixtures include a small catalytic amount of a free radical initiator such as benzoyl peroxide previously referred to, or tertiary butyl hydroperoxide, cyclohexyl hydroperoxide, acetyl peroxide, lauroyl peroxide or others. These usually are employed in amounts within a range of about 0.1 to 5 percent by weight based upon the interpolymerizable mixture. These catalysts tend strongly to increase the corrosive action of the mixtures with respect to copper, but are usually necessary if fully cured products are to be obtained in a short time and at moderate temperatures. Curing temperatures are usually in a range of about 100° F. to 300° F.

Interpolymerizable mixtures of polyesters containing alpha-beta ethylenically unsaturated groups and monomers containing terminal ethylenic groups, and which also include glycolic acid, when properly catalyzed with a free radical initiator, such as benzoyl peroxide or others as above mentioned, may be employed as liquid casting media, for example in the potting of coils of copper wire such as are often employed in electrical apparatus. The interpolymerizable mixtures containing the bodies of copper may be cured to a hard, chemically resistant state in which they are of high electrical resistance and of high dielectrical value, merely by heating at a moderate temperature and without application of pressure.

In those instances where the interpolymerizable mixture containing glycolic acid is employed as a liquid in the coating or impregnating of castings or similar articles containing copper, the polyester containing an emulsifying agent, preferably a polyethylene glycol cooked in as a polyhydroxy component of the polyester, is mixed with a monomer such as styrene, diallyl phthalate, or the like. The corrosion inhibitor system as herein disclosed, is also included. When the mixture is to be used, for example in the impregnation of a casting, a catalyst such as benzoyl peroxide or similar peroxide agent acting as a catalyst is added. The liquid mixture is applied as previously described by spraying or dipping (preferably under alternate applications of vacuum and pressure to assure thorough permeation). Subsequently, the article is washed with water in order to remove excess emulsifiable material from the surface. The article is then heated to affect a cure of the interpolymerizable mixture to the desired state of hardness and infusibility in the pores of the metal.

Specific applications of the use of the invention are illustrated by the following examples:

Example I

In this example, a polyester was prepared by esterification reaction between:

1 mole of maleic acid
1 mol of phthalic acid
2.2 moles of propylene glycol

The foregoing mixture was modified by addition of 21 percent by weight based upon the mixture of so-called Carbowax 1540, which is a polyethylene glycol understood to have a molecular weight of about 1300 to 1600 (average). A solvent (xylene) was added and the mixture was heated to esterification temperature (about 385° F.) in the absence of air and with evolution and azeotropic removal of water. At the conclusion of the reaction the product was blown with inert gas to remove volatile matter and a gelation inhibitor such as hydroquinone was added. The mixture was brought to a temperature of 240° F. to 250° F. and styrene was added to provide an interpolymerizable mixture of the following composition:

| | Parts by weight |
|---|---|
| Styrene | 29 |
| Polyester | 71 |
| Hydroquinone | 0.077 |

A series of different samples was prepared from the foregoing mixture by varying the proportion of glycolic acid over a range of 0.2 to 0.8 percent by weight based upon the interpolymerizable mixture. To the samples was added 1 percent by weight based upon the mixture of finely divided copper and the samples were incubated in an oven at 150° F. and were observed daily for the appearance of corrosion as evidenced by the appearance of a green discoloration.

The results of these several tests are tabulated as follows:

| Sample Number | Percent of Glycolic Acid | Days required to Turn Green |
|---|---|---|
| 1 | 0.4 | 31 |
| 2 | 0.6 | over 55 |
| 3 | 0.8 | over 55 |

The mixtures containing the glycolic acid are highly resistant to interaction with copper to produce a green discoloration, even at the relatively high temperature of 150° F. Mixtures containing no corrosion inhibitor would produce a green discoloration in a period of one or two days.

The foregoing interpolymerizable mixture can be employed for impregnating castings of more or less porous nature and comprising copper, tin or the like as a component. In order to apply the mixture to corrodible metal such as copper or an alloy thereof, the articles to be treated are first subjected to vacuum and are then immersed under a hydrostatic pressure to promote permeation of the mixture into the pores of the metal. It is an advantage of the present invention that castings impregnated with the foregoing interpolymerizable mixture may be washed with water in order to remove excess material. The castings or other articles may be baked to cure the resin in the pores.

*Example II*

This example illustrates the preparation of an interpolymerizable material which is well adapted for potting coils, or otherwise coating or embedding electrical apparatus containing copper. The polyester of this example comprises:

| | Moles |
|---|---|
| Maleic acid | 1 |
| Adipic acid | 6 |
| Diethylene glycol | 7.18 |

The mixture is heated in accordance with conventional practice to drive off water of reaction and to form a polyester of appropriate molecular weight. In order to form an interpolymerizable mixture, the polyester may be mixed with an equal weight of styrene which has been inhibited against premature gelation by the incorporation of 0.025 percent by weight of hydroquinone. Test samples of this material may be catalyzed by means of 1.5 percent by weight of benzoyl peroxide and gelled. Coils of copper wire, or other copper-containing articles may be embedded therein at a temperature of about 160° F. Ultimately, the mixture should be baked at a temperature of about 250° F. in order to obtain maximum cure.

While the use of glycolic acid as an anticorrosion agent has been stressed, it will be apparent that the glycolic acid may also be employed as a gelation inhibitor in mixtures of polyesters and monomers which are employed in the general art, for example in forming castings or laminates where corrosion resistance is not required.

The forms of the invention as herein disclosed are to be considered as being by way of example, rather than limitation. It will be apparent to those skilled in the art that many modifications may be made therein without departure from the spirit of the invention or the scope of the appended claims.

I claim:

1. An interpolymerizable mixture of (A) a monomer containing a $>C=CH_2$ group, (B) a polyester of a dihydric alcohol and an alpha-beta ethylenic dicarboxylic acid and, (C) glycolic acid, the latter being in an amount of about 0.01 to 5 percent based upon the interpolymerizable mixture.

2. An interpolymerizable mixture of (A) a monomer containing a $>C=CH_2$ group, (B) a polyester of a dihydric alcohol and a material of a class consisting of an alpha-beta ethylenic dicarboxylic acid and a mixture of said acid and an aliphatic dicarboxylic acid and, (C) glycolic acid, the latter being in an amount of about 0.01 to 5 percent based upon the interpolymerizable mixture.

3. An interpolymerizable mixture of (A) a soluble interpolymerizable monomer containing a $>C=CH_2$ group, (B) a polyester of a plurality of alcohols, one of which is dihydric and contains 2 to 6 carbon atoms in an open chain and the other of which is polyethylene glycol, and a dicarboxylic acid material said material containing an alpha-beta ethylenic group and, (C) glycolic acid, the latter being in an amount of about 0.01 to 5 percent based upon the interpolymerizable mixture.

4. A body comprising a corrodible metal disposed in contact with a mixture of (A) a polyester of a mixture of (1) polyhydric alcohols one of which is dihydric and contains 2 to 6 carbon atoms in an open chain, and the other of which is a polyethylene glycol and (2) a dicarboxylic acid, (B) a monomer containing a $>C=CH_2$ group and, (C) glycolic acid, the latter being in an amount of about 0.01 to 5 percent based upon the interpolymerizable mixture.

5. A method inhibiting the corrosive action upon copper of interpolymerizable mixtures of a monomer containing a $>C=CH_2$ group and a polyester of a glycol and an alpha-beta ethylenic dicarboxylic acid which comprises incorporating into said mixture glycolic acid in small corrosion inhibiting amounts, the latter being in an amount of about 0.01 to 5 percent based upon the interpolymerizable mixture.

6. As an article of manufacture, a body of copper embedded in a resinous medium which is the interpolymer of (A) an ester of an alpha-beta ethylenic dicarboxylic acid and a glycol and (B) a monomer containing a $>C=CH_2$ group, said interpolymer further containing glycolic acid in small corrosion inhibiting amounts, the latter being in an amount of about 0.01 to 5 percent based upon the interpolymerizable mixture.

7. An interpolymerizable mixture of (A) a monomer containing a $>C=CH_2$ group, (B) a polyester of (1) a polyhydric alcohol mixture of a dihydric alcohol containing 2 to 6 carbon atoms in an open chain and polyethylene glycol (2) a mixture of an alpha-beta ethylenic dicarboxylic acid and a non-ethylenic dicarboxylic acid and, (C) glycolic acid, the latter being in an amount of about 0.01 to 5 percent based upon the interpolymerizable mixture.

8. As a new article of manufacture a body of porous metal the pores of which are closed by an interpolymerized mixture of a monomer containing a $>C=CH_2$ group, a polyester of an alpha-beta ethylenic dicarboxylic acid and a dihydric alcohol and glycolic acid, the latter being in an amount of about 0.01 to 5 percent upon the interpolymerizable mixture.

References Cited in the file of this patent

UNITED STATES PATENTS

| 2,349,044 | Jahn | May 16, 1944 |
| 2,566,739 | Moore et al. | Sept. 4, 1951 |